United States Patent
Takeda et al.

(10) Patent No.: US 6,851,524 B2
(45) Date of Patent: Feb. 8, 2005

(54) DISC BRAKE FOR MOTOR VEHICLES

(75) Inventors: Toshiyuki Takeda, Nagano (JP); Bunzo Seki, Saitama (JP); Yuji Hayashi, Saitama (JP)

(73) Assignees: Nissin Kogyo Co., Ltd., Ueda (JP); Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/606,802

(22) Filed: Jun. 27, 2003

(65) Prior Publication Data

US 2004/0016609 A1 Jan. 29, 2004

(30) Foreign Application Priority Data

Jun. 28, 2002 (JP) ........................................ 2002-189579

(51) Int. Cl.[7] .............................................. F16D 65/38
(52) U.S. Cl. ................................. 188/73.39; 188/73.43
(58) Field of Search ............................. 188/72.1, 71.1, 188/72.6, 73.43, 73.44, 73.45, 73.31, 73.32, 73.41, 73.42, 73.46, 73.39

(56) References Cited

U.S. PATENT DOCUMENTS

| | | | | | |
|---|---|---|---|---|---|
| 3,346,076 | A | * | 10/1967 | Hayes ...................... | 188/73.45 |
| 4,171,035 | A | * | 10/1979 | Takaaki .................... | 188/73.45 |
| 4,234,061 | A | * | 11/1980 | Margetts et al. .......... | 188/73.45 |
| 4,355,707 | A | * | 10/1982 | Saito ....................... | 188/73.45 |
| 4,574,923 | A | * | 3/1986 | Nakajima et al. ......... | 188/73.45 |
| 5,467,847 | A | * | 11/1995 | Antony et al. ............ | 188/73.43 |

FOREIGN PATENT DOCUMENTS

JP    56-76732    6/1981

* cited by examiner

Primary Examiner—Thomas Williams
(74) Attorney, Agent, or Firm—Westerman, Hattori, Daniels & Adrian, LLP

(57) ABSTRACT

The disc brake for a motor vehicle contains a caliper bracket to be secured to a vehicle body on the outer side of a disc rotor with respect to the vehicle body, a caliper body supported by the caliper bracket to be slidable in the axial direction of the disc rotor and a pair of friction pads disposed to oppose each other through the disc rotor. The caliper bracket contains a bracket main body and a connecting arm which are disposed respectively on the outer side and on the inner side of the disc rotor with respect to the vehicle body, as well as, a pair of caliper supporting arms, which connect the bracket main body with the connecting arm at their disc turning-in side end portions and at their disc turning-out side end portions, respectively. The bracket main body and the connecting arm have torque receiving portions at least on the disc turning-out side respectively to receive braking torques from the respective friction pads; the bracket main body has a disc turning-out side fixing portion, where the caliper bracket is secured to the vehicle body, located outer than the disc turning-out side torque receiving portion toward the disc turning-out side and substantially on the peripheral edge of the disc rotor.

3 Claims, 5 Drawing Sheets

DISC BRAKE FOR MOTOR VEHICLES

BACKGROUND OF THE INVENTION

The present invention relates to a disc brake employed in automobiles, motorcycles and other motor vehicles, more particularly to a structure of supporting a pin slide type caliper body with a caliper bracket.

DESCRIPTION OF THE RELATED ART

A typical pin slide type caliper body employed in a vehicular disc brake contains an actuation section, a reaction section and a bridge. The actuation section and the reaction section are located on the inner side and outer side of a disc rotor with respect to a vehicle body (hereinafter referred simply to as the inner side and the outer side), respectively, and the bridge connects the actuation section and the reaction section across the peripheral edge of the disc rotor. The caliper body is supported by a caliper bracket secured to the vehicle body through a pair of slide pins such that it can slide in the axial direction of the disc rotor. The actuation section of the caliper body has a fairly large volume and is quite weighty compared with the reaction section, since the former contains in its hydraulic chamber a piston, a bleeder screw and other braking elements. Consequently, the caliper body is generally supported by a caliper bracket provided on the actuation section side of the disc rotor.

However, a disc brake illustrated in Japanese Unexamined Patent Publication No. Sho 56-76732 has a caliper bracket formed to extend over the peripheral edge of a disc rotor, and the caliper bracket is secured to a vehicle body at the reaction section side thereof. Besides, portions of the caliper bracket to be secured to the vehicle body are located near the disc axis far from torque receiving portions which receive braking torques from friction pads. Therefore, the caliper bracket has poor rigidity for supporting the caliper body, and braking torques from the friction pads act upon the caliper bracket as bending moments in the disc turning-out direction to deflect the caliper bracket and the caliper body, leading frequently to loss of braking force, interference of sliding movement of the caliper body in the axial direction of the disc rotor, tilting of friction pads to cause biased abrasion of the lining thereof and other problems.

An object of the present invention is to provide a disc brake for a motor vehicle which minimizes deflection of the caliper body and caliper bracket attributed to braking torque to secure a predetermined braking force and to achieve smooth movement of the caliper body and which can prevent biased abrasion of lining.

SUMMARY OF THE INVENTION

A first aspect of the present invention is a disc brake for a motor vehicle comprising a caliper bracket to be secured to a vehicle body on the outer side of a disc rotor with respect to the vehicle body, a caliper body supported by the caliper bracket to be slidable in the axial direction of the disc rotor and a pair of friction pads disposed to oppose each other through the disc rotor; the caliper body containing an actuation section and a reaction section located on the inner side and on the outer side of the disc rotor with respect to the vehicle body, as well as, a bridge connecting the actuation section integrally with the reaction section over a peripheral edge of the disc rotor; wherein the caliper bracket contains a bracket main body and a connecting arm which are disposed respectively on the outer side and on the inner side of the disc rotor with respect to the vehicle body, as well as, a pair of caliper supporting arms, which connect the bracket main body with the connecting arm at their disc turning-in side end portions and at their disc turning-out side end portions, respectively; the bracket main body and the connecting arm have torque receiving portions at least on the disc turning-out side respectively to receive braking torques from the respective friction pads; the bracket main body has a disc turning-out side fixing portion, where the caliper bracket is secured to the vehicle body, located outer than the disc turning-out side torque receiving portion toward the disc turning-out side and substantially on the peripheral edge of the disc rotor. Further, the caliper bracket has a disc turning-in side fixing portion, where the caliper bracket is secured to the vehicle body, located outer than the disc turning-in side torque receiving portion toward the disc turning-in side and inner than the disc turning-in side torque receiving portion with respect to the radius of the disc rotor.

A second aspect of the present invention is a disc brake for a motor vehicle having a caliper bracket to be secured to a vehicle body on the outer side of a disc rotor with respect to the vehicle body, a caliper body supported by the caliper bracket to be slidable in the axial direction of the disc rotor and a pair of friction pads disposed to oppose each other through the disc rotor; the caliper body containing an actuation section and a reaction section located on the inner side and on the outer side of the disc rotor with respect to the vehicle body, as well as, a bridge connecting the actuation section integrally with the reaction section over a peripheral edge of the disc rotor; wherein the caliper bracket contains a substantially U-shaped bracket main body steering clear of the outer friction pad from the disc turning-in side toward the disc turning-out side thereof, a substantially U-shaped connecting arm steering clear of the inner friction pad from the disc turning-in side toward the disc turning-out side thereof and a pair of caliper supporting arms which connect the bracket main body with the connecting arm at their disc turning-in side end portions and at their disc turning-out side end portions, respectively; the connecting arm is disposed on the inner side of the disc rotor with respect to the vehicle body to oppose the bracket main body disposed on the outer side of the disc rotor, and the pair of caliper supporting arms extend over the peripheral edge of the disc rotor in the axial direction of the disc rotor with the bridge being interposed between them; the bracket main body and the connecting arm have torque receiving portions respectively which support disc turning-in side faces and disc turning-out side faces of the respective friction pads to be slidable in the axial direction of the disc rotor, the pair of caliper supporting arms having pin supporting portions which support the caliper body to be slidable in the axial direction of the disc rotor; the bracket main body has a disc turning-in side fixing portion and a disc turning-out side fixing portion, the disc turning-in side fixing portion being located outer than the disc turning-in side torque receiving portion toward the disc turning-in side and inner than that torque receiving portion with respect to the radius of the disc rotor, whereas the disc turning-out side fixing portion being located outer than the disc turning-out side torque receiving portion toward the disc turning-out side and substantially on the peripheral edge of the disc rotor.

According to the disc brake for a motor vehicle of the present invention, deflection of the caliper bracket and caliper body attributed to braking torque can be minimized. Thus, braking loss can be minimized to enable securing of a predetermined braking force. In addition, the caliper body can slide smoothly in the axial direction of the disc rotor, so that the linings of the friction pads wear hardly.

Other aspects and advantages of the invention will become apparent from the following description, taken in conjunction with the accompanying drawings illustrated by way of examples the principles of the invention.

BRIEF DESCRIPTION OF THE DRAWINGS

The invention together with the objects and advantages thereof, may best be understood by reference to the following description of the presently preferred embodiments together with the accompanying drawings in which.

DETAILED DESCRIPTION OF THE PREFERRED EMBODIMENTS

Figure 1:
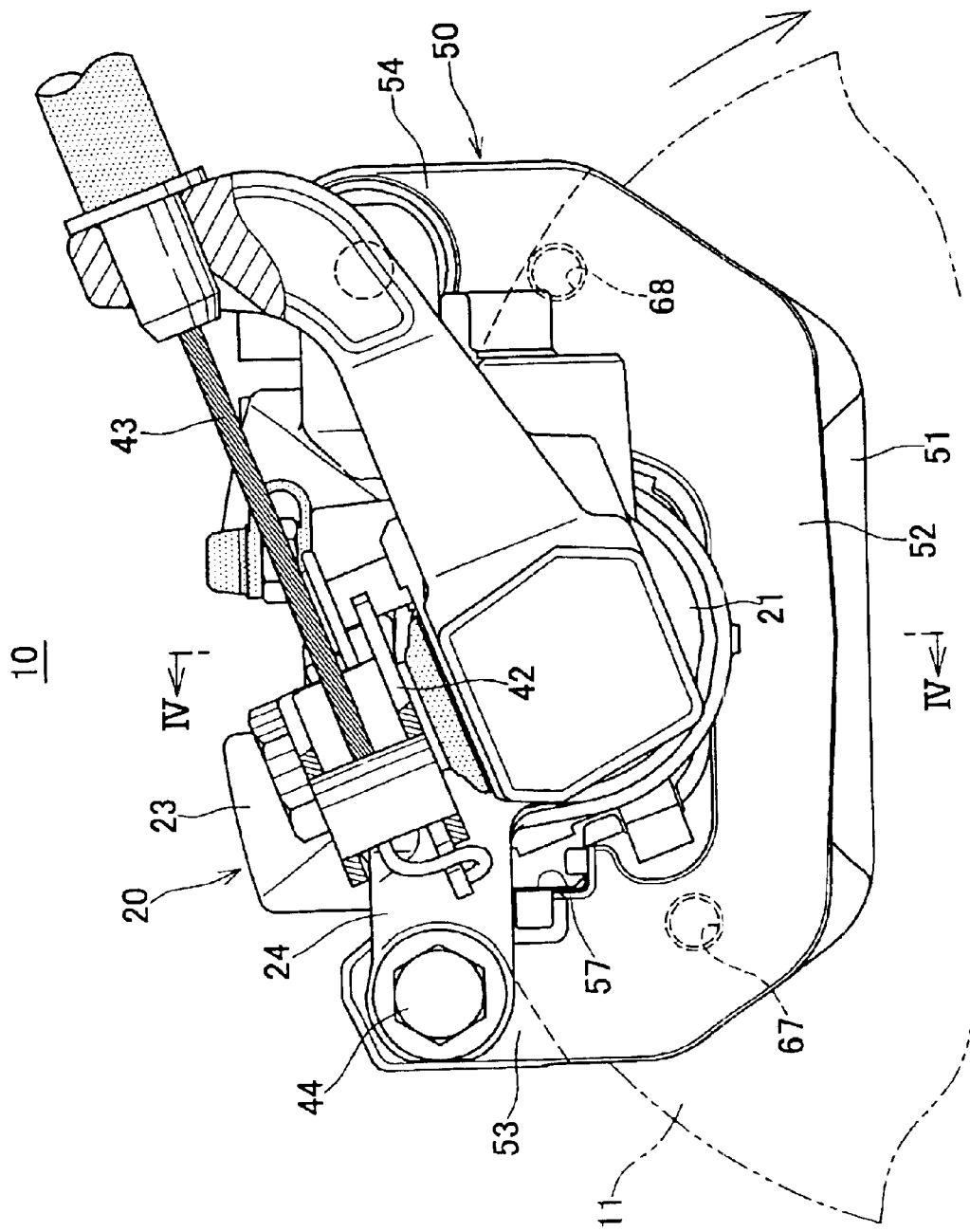
FIG. 1 is a front view of the disc brake according to one embodiment of the present invention.
Figure 2:
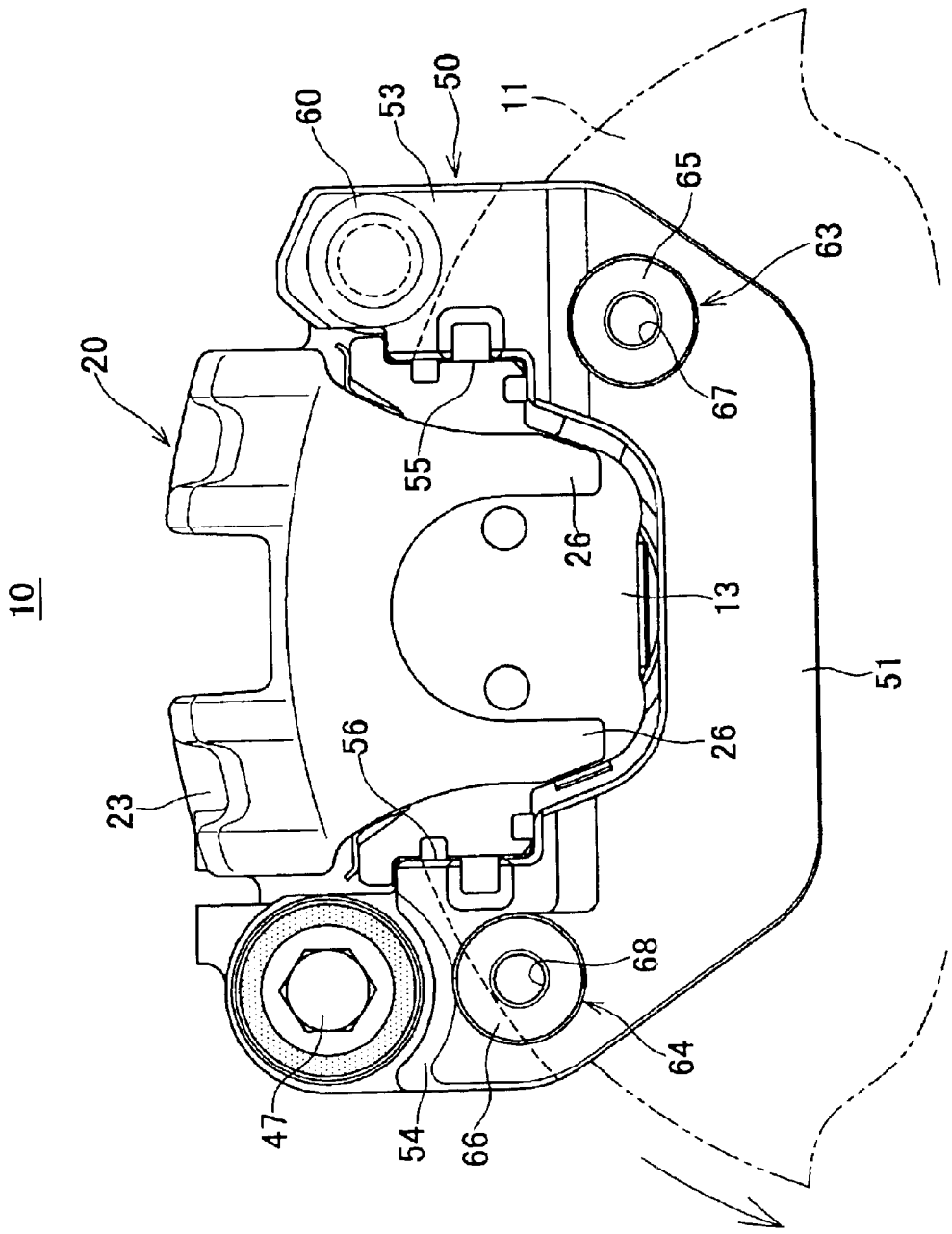
FIG. 2 is a back view of the disc brake shown in FIG. 1.
Figure 3:
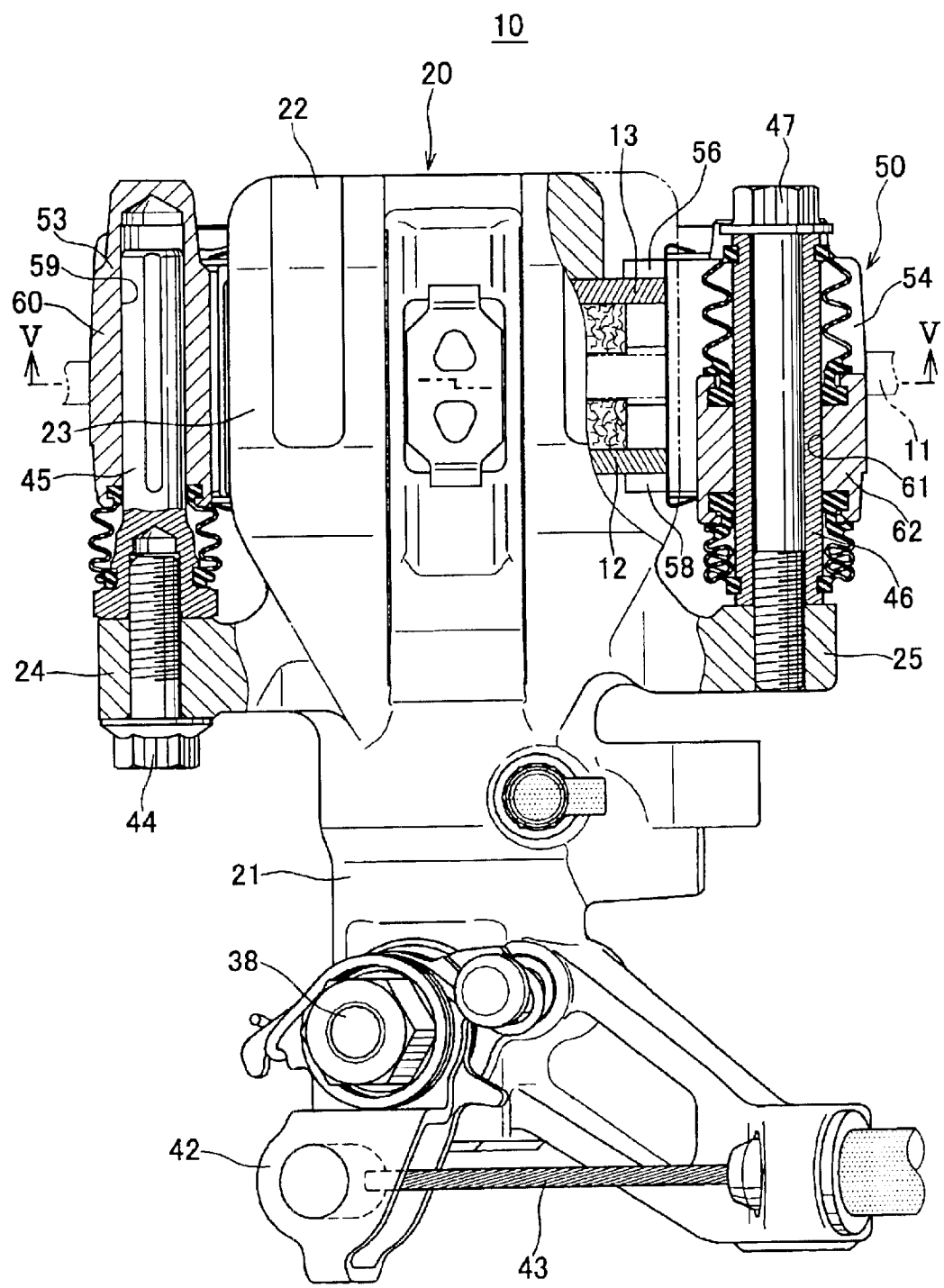
FIG. 3 is a partially cross-sectional plan view of the disc brake shown in FIG. 1.
Figure 4:
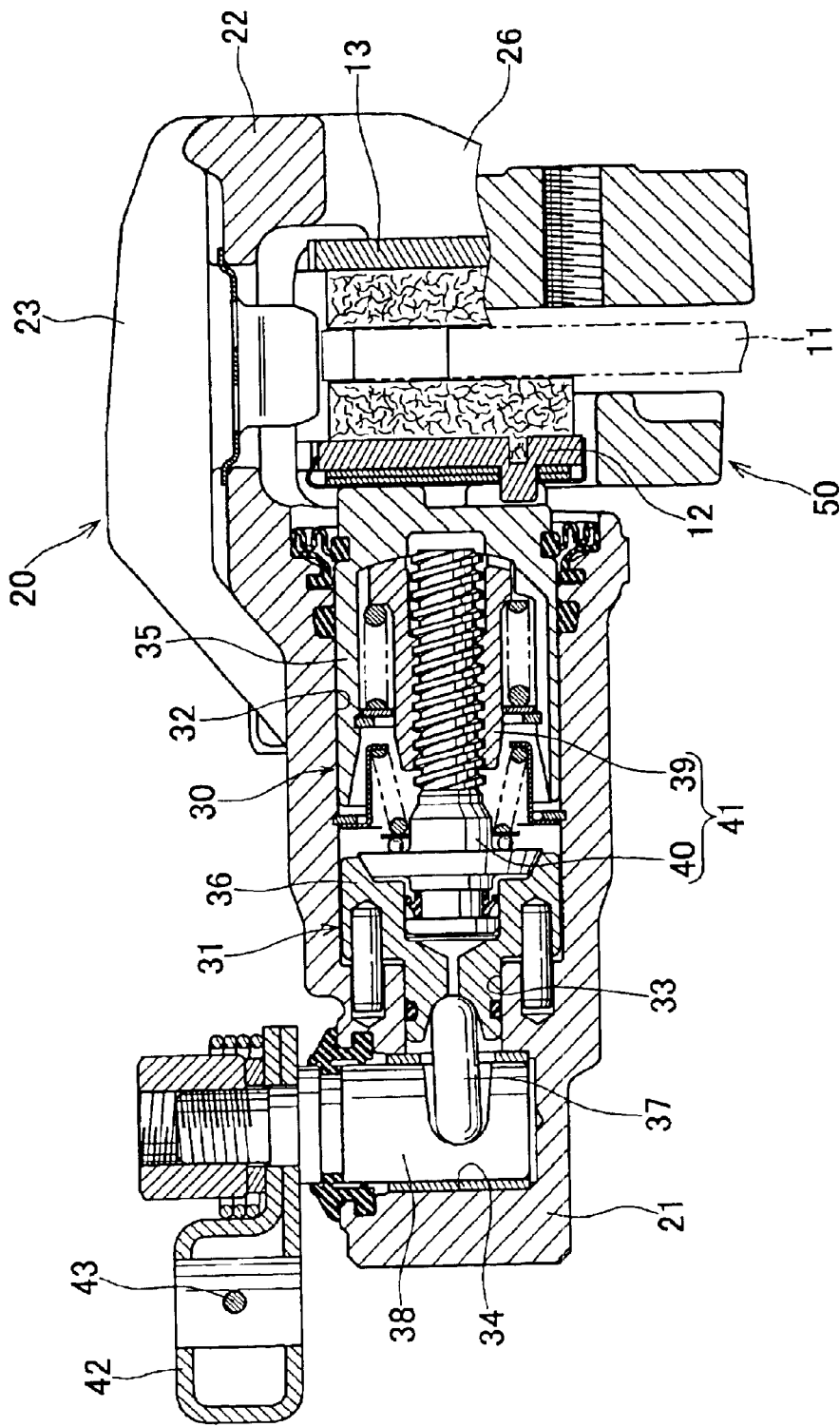
FIG. 4 is a cross-sectional view taken along the line IV—IV in FIG. 1.
Figure 5:
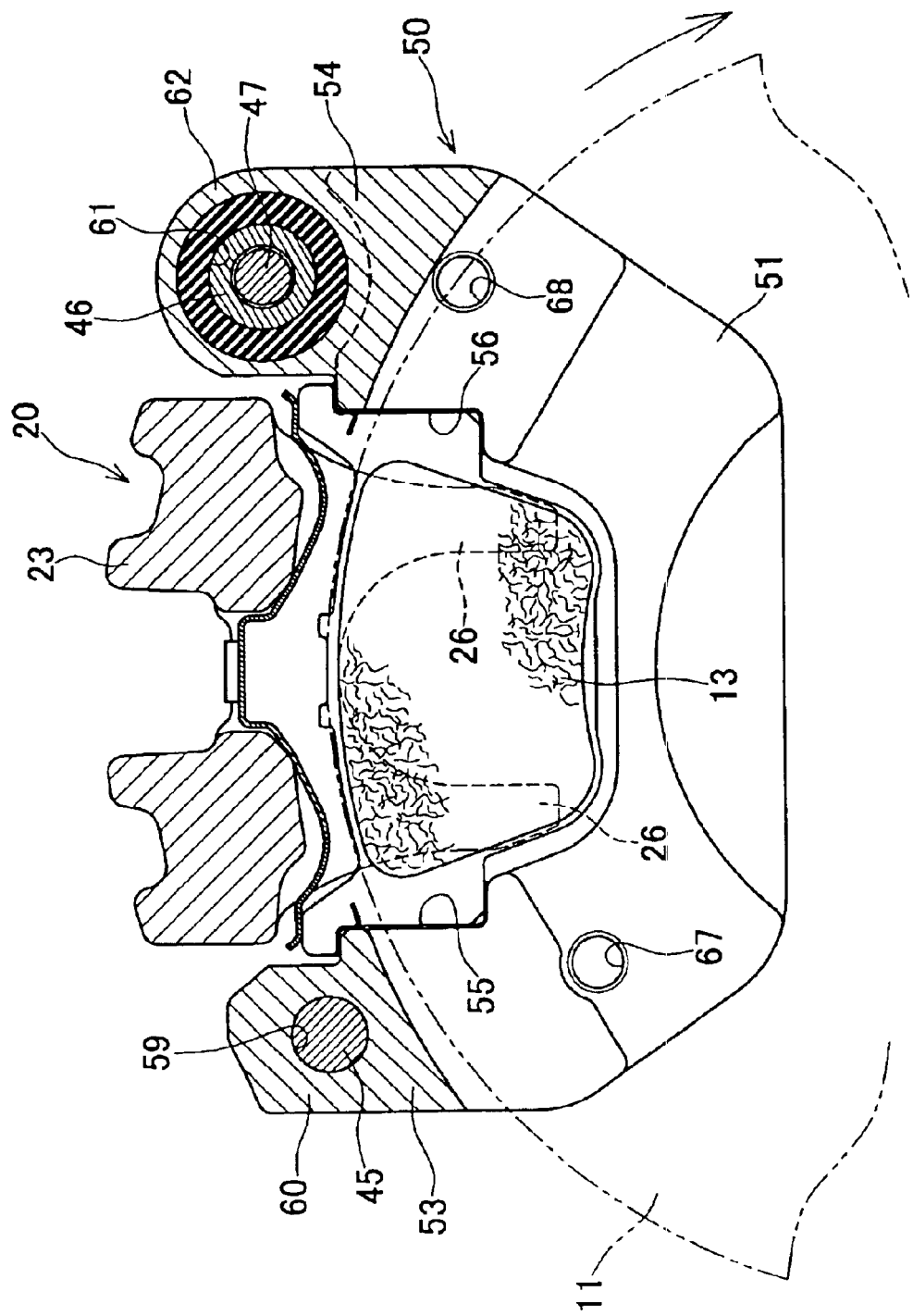
FIG. 5 is a cross-sectional view taken along the line V—V in FIG. 3.

The present invention will be described below by way of an embodiment applied to a disc brake provided with a parking brake to be attached to a rear wheel of an automobile referring to the attached drawings.

The disc brake 10 contains a caliper body 20 and a caliper bracket 50 supporting the caliper body 20. The caliper bracket 50 is secured to a body of a vehicle. The caliper body 20 is slidably supported by the caliper bracket 50.

The caliper body 20 contains an actuation section 21, a reaction section 22 and a bridge 23. The actuation section 21 and the reaction section 22 are located on the inner side and the outer side of a disc rotor 11, respectively. The bridge 23 connects the actuation section 21 with the reaction section 22 over the peripheral edge of the disc rotor 11. The actuation section 21 contains a combination of a hydraulic operating system 30 to be operated by a brake pedal (not shown) and a mechanical operating system 31 to be operated by a hand lever (not shown). The hydraulic operating system 30 is used during driving of a vehicle, whereas the mechanical operating system 31 is used during parking or at the time of hill start.

The actuation section 21 has a pair of mounting arms 24 and 25 protruding on the disc turning-in side and on the disc turning-out side, respectively. The reaction section 22 has a pair of reaction claws 26. The actuation section 21 and the reaction section 22 have friction pads 12 and 13, respectively, disposed to oppose each other through the disc rotor 11 such that they can hold the peripheral zone of the disc rotor 11 between them. The actuation section 21 contains a cylinder bore 32, a connecting hole 33 and a bearing hole 34. The cylinder bore 32 and the bearing hole 34 communicate with each other through the connecting hole 33.

The cylinder bore 32 opens toward the disc rotor side, and a piston 35 of the hydraulic operating system 30 is housed therein on the disc rotor side. A sleeve piston 36, a push rod 37 and a cam shaft 38 of the mechanical operating system 31 are disposed in the connecting hole 33 and the bearing hole 34 formed at the other end of the cylinder bore 32. An adjuster 41 composed essentially of an adjust nut 39 and an adjust bolt 40 is interposed between the piston 35 and the sleeve piston 36. The bearing hole 34 opens to the top face of the actuation section 21, and the cam shaft 38 protrudes upward from the bearing hole 34. A cam lever 42 is fixed to the outer end of the cam shaft 38. The cam lever 42 is connected to the hand lever through a wire cable 43.

As described above, the actuation section 21 containing a combination of the hydraulic operating system 30 and the mechanical operating system 31 has a fairly large volume and is quite weighty compared with the reaction section 22 having reaction claws 26 only. Therefore, the weight of the caliper body 20 is substantially occupied by the actuation section 21.

The caliper bracket 50 contains a substantially U-shaped bracket main body 51 steering clear of the friction pad 13 from the disc turning-in side toward the disc turning-out side thereof, a substantially U-shaped connecting arm 52 steering clear of the friction pad 12 from the disc turning-in side toward the disc turning-out side thereof and a pair of caliper supporting arms 53 and 54. The caliper supporting arms 53 and 54 connect the bracket main body 51 with the connecting arm 52 at their disc turning-in side end portions and at their disc turning-out side end portions, respectively. The bracket main body 51 is located on the outer side of the disc rotor 11. The connecting arm 52 is disposed on the inner side of the disc rotor 11 to oppose the bracket main body 51. The caliper supporting arms 53 and 54 extend in the axial direction of the disc rotor over the peripheral edge of the disc rotor 11 and that the bridge 23 is interposed between them.

The bracket main body 51 has stepped torque receiving portions 55 and 56 that support the disc turning-in side face and the disc turning-out side face of the friction pad 13, respectively, such that the friction pad 13 can slide in the axial direction of the disc rotor. The connecting arm 52 has stepped torque receiving portions 57 and 58 that support the disc turning-in side face and the disc turning-out side face of the friction pad 12, respectively, such that the friction pad 12 can slide in the axial direction of the disc rotor. The torque receiving portions 55, 56, 57 and 58 are located substantially on the peripheral zone of the disc rotor 11, since the friction pads 12 and 13 are located to oppose each other through the peripheral zone of the disc rotor 11.

The caliper supporting arm 53 located on the disc turning-in side has a pin supporting portion 60 containing a hole 59 defined in the axial direction of the disc rotor to open toward the mounting arm 24 side. A slide pin 45, which is secured to the mounting arm 24 with a bolt 44 to extend toward the reaction section 22, is slidably inserted into the hole 59. The caliper supporting arm 54 located on the disc turning-out side has a short pin supporting portion 62 containing a through hole 61 defined in the axial direction of the disc rotor. A sleeve 46 is inserted into the through hole 61 such that the end portions thereof protrude from the caliper supporting arm 54 and that it can slide in the axial direction of the disc rotor. The sleeve 46 is secured to the mounting arm 25 on the reaction section 22 side thereof with a bolt 47 inserted through the sleeve 46 from the reaction section side and engaged with the mounting arm 25. Thus, the caliper body 20 slides in the axial direction of the disc rotor under the guidance of the slide pin 45 and the sleeve 46 when brake is put on and off.

The bracket main body 51 has fixing portions 63 and 64 on the disc turning-in side and on the disc turning-out side respectively. The bracket main body 51 is secured to a vehicle body at these fixing portions 63 and 64. These fixing portions 63 and 64 have seats 65 and 66 and female screw holes 67 and 68 defined at the centers of the seats 65 and 66, respectively. The bracket main body 51 is secured to the vehicle body with fixing bolts (not shown) through these female screw holes 67 and 68. On the disc turning-in side, the fixing portion 63 is located outer than the torque receiving portion 55 toward the disc turning-in side and inner than the torque receiving portion 55 with respect to the radius of the disc rotor 11. On the disc turning-out side, the fixing portion 64 is located outer than the torque receiving portion 56 toward the disc turning-out side and substantially on the peripheral edge of the disc rotor 11.

In the disc brake 10 having the constitution as described above, when a braking operation is performed with the hydraulic operating system 30 or the mechanical operating system 31, the piston 35 is pushed out toward the disc rotor to bring the friction pad 12 on the actuation section 21 side into abutment against the inner side face of the disc rotor 11. The caliper body 20 is pulled by the reaction of this thrusting force to slide toward the inside of the vehicle body under the guidance of the slide pin 45 and the sleeve 46, and the reaction claws 26 push the friction pad 13 on the reaction section side against the outer side face of the disc rotor 11. The friction pads 12 and 13 nip the disc rotor 11 to exert a braking action.

Under this braking action, the friction pad 12 is dragged in the rotational direction of the disc rotor 11 (shown by the arrow) to be pressed against the torque receiving portion 58 on the disc turning-out side to generate a braking torque. This braking torque is transmitted to the connecting arm 52. Likewise, the friction pad 13 is dragged in the rotational direction of the disc rotor 11 (shown by the arrow) to be pressed against the torque receiving portion 56 on the disc turning-out side to generate a braking torque. This braking torque is transmitted to the bracket main body 51.

The braking torques transmitted to the bracket main body 51 and the connecting arm 52 act as bending moments in the disc turning-out direction upon the bracket main body 51 and the connecting arm 52, respectively, to try to deflect the caliper bracket 50 and the caliper body 20. However, the fixing portion 64 on the disc turning-out side is located on the peripheral zone of the disc rotor 11 like the torque receiving portion 56, so that it can receive the braking torque at the position proximate to the torque receiving portion 56. Thus, the fixing portion 64 comes to have an increased mounting rigidity to minimize deflection of the caliper bracket 50 and the caliper body 20.

Thus, even if the caliper bracket 50 holds the caliper body 20 on the reaction section 22 side apart from the center of gravity of the caliper body 20, loss of braking force can be minimized, and further the caliper body 20 can slide smoothly in the axial direction of the disc rotor to inhibit biased abrasion of the linings of the friction pads 12 and 13. Besides, in this embodiment, since end portions of the caliper supporting arm 53 and those of the caliper supporting arm 54 are connected to the substantially U-shaped bracket main body 51 and the substantially U-shaped connecting arm 52, respectively, rigidity of the caliper bracket 50 is increased to enhance further the above effects. Further, the locations of the fixing portions 63 and 64 are staggered in the radial direction of the disc rotor 11, so that inclination of the caliper body 20 toward the weighty actuation section 21 can be minimized.

It should be apparent to those skilled in the art that the present invention may be embodied in many other specific forms without departing from the spirit or scope of the invention.

Note that in the present invention, at least one combination of the torque receiving portion and the fixing portion is essentially provided on the disc turning-out (during driving) side of the caliper bracket in the manner as described in the above embodiment, and locations of other torque receiving portions and other fixing portions are not limited particularly.

Therefore, the present examples and embodiments are to be considered as illustrative and not restrictive, and the invention is not to be limited to the details given herein, but may be modified within the scope of the appended claims.

What is claimed is:

1. A disc brake for a motor vehicle comprising a caliper bracket to be secured to a vehicle body on the outer side of a disc rotor with respect to the vehicle body, a caliper body supported by the caliper bracket to be slidable in an axial direction of the disc rotor and a pair of friction pads disposed to oppose each other through the disc rotor; the caliper body containing an actuation section and a reaction section located on the inner side and on the outer side of the disc rotor with respect to the vehicle body, as well as, a bridge connecting the actuation section integrally with the reaction section over a peripheral edge of the disc rotor;

wherein the caliper bracket comprises a bracket main body and a connecting arm which are disposed respectively on the outer side and on the inner side of the disc rotor with respect to the vehicle body, as well as, a pair of caliper supporting arms, which connect the bracket main body with the connecting arm at their disc turning-in side end portions and at their disc turning-out side end portions, respectively; the bracket main body and the connecting arm have torque receiving portions at least on the disc turning-out side respectively to receive braking torques from the respective friction pads; the bracket main body has a disc turning-in side fixing portion and a disc turning-out side fixing portion securing the caliper bracket to the vehicle body on the outer side of the disc rotor, and the disc turning-out side fixing portion is located outer than a disc turning-out side torque receiving portion toward the disc turning-out side and substantially on the peripheral edge of the disc rotor.

2. The disc brake for a motor vehicle according to claim 1, wherein the caliper bracket has a disc turning-in side fixing portion, where the caliper bracket is secured to the vehicle body, located outer than the disc turning-in side torque receiving portion toward the disc turning-in side and inner than the disc turning-in side torque receiving portion with respect to the radius of the disc rotor.

3. A disc brake for a motor vehicle comprising a caliper bracket to be secured to a vehicle body on the outer side of a disc rotor with respect to the vehicle body, a caliper body supported by the caliper bracket to be slidable in an axial direction of the disc rotor and a pair of friction pads disposed to oppose each other through the disc rotor; the caliper body containing an actuation section and a reaction section located on an inner side and on an outer side of the disc rotor with respect to the vehicle body, as well as, a bridge connecting the actuation section integrally with the reaction section over a peripheral edge of the disc rotor;

wherein the caliper bracket comprises a substantially U-shaped bracket main body steering clear of the outer friction pad from a disc turning-in side toward a disc turning-out side thereof, a substantially U-shaped connecting arm steering clear of an inner friction pad from the disc turning-in side toward the disc turning-out side thereof and a pair of caliper supporting arms which connect the bracket main body with the connecting arm at their disc turning-in side end portions and at their disc turning-out side end portions, respectively; the connecting arm is disposed on the inner side of the disc rotor with respect to the vehicle body to oppose the bracket main body disposed on the outer side of the disc rotor, and the pair of caliper supporting arms extend over a peripheral edge of the disc rotor in the axial direction of the disc rotor with the bridge being interposed between them; the bracket main body and the connecting arm have torque receiving portions respectively which support disc turning-in side faces and disc turning-out side faces of the respective friction pads to be slidable in the axial direction of the disc rotor, the pair of caliper supporting arms having pin supporting portions which support the caliper body to be slidable in the axial direction of the disc rotor; the bracket main body has a disc turning-in side fixing portion and a disc turning-out side fixing portion securing the caliper bracket to the vehicle body on the outer side of the disc rotor, the disc turning-in side fixing portion being located outer than the disc turning-in side torque receiving portion toward the disc turning-in side and inner than that torque receiving portion with respect to the radius of the disc rotor, whereas the disc turning-out side fixing portion being located outer than the disc turning-out side torque receiving portion toward the disc turning-out side and substantially on the peripheral edge of the disc rotor.

* * * * *